United States Patent
Pickard

(12) 
(10) Patent No.: US 7,021,372 B2
(45) Date of Patent: Apr. 4, 2006

(54) HYDRONIC RADIANT HEAT TUBING RECEPTACLE AND HEAT DISTRIBUTION PANEL SYSTEM

(76) Inventor: Dale H. Pickard, 527 N. Montana St., Bozeman, MT (US) 59715

( * ) Notice: Subject to any disclaimer, the term of this patent is extended or adjusted under 35 U.S.C. 154(b) by 0 days.

(21) Appl. No.: 10/911,150

(22) Filed: Aug. 3, 2004

(65) Prior Publication Data

US 2005/0028966 A1 Feb. 10, 2005

Related U.S. Application Data

(63) Continuation of application No. 10/434,520, filed on May 7, 2003, now abandoned.

(51) Int. Cl.
*F28F 3/12* (2006.01)
(52) U.S. Cl. .......................... 165/168; 165/53; 165/56; 165/49; 237/69
(58) Field of Classification Search .................. 237/69; 165/53, 56, 65, 49, 168
See application file for complete search history.

(56) References Cited

U.S. PATENT DOCUMENTS

| | | |
|---|---|---|
| 1,800,150 A | 4/1931 | Musgrave |
| 2,480,427 A | 8/1949 | Stanton |
| 2,687,626 A | 8/1954 | Bartlowe |
| 2,799,481 A | 7/1957 | Becker |
| 4,094,301 A | 6/1978 | Sorenson et al. |
| 4,338,994 A | 7/1982 | Hewing et al. |
| 4,576,221 A | 3/1986 | Fennesz |
| 4,624,242 A | 11/1986 | McCall |
| 4,766,951 A | 8/1988 | Bergh |
| 5,292,065 A | 3/1994 | Fiedrich |
| 5,454,428 A | 10/1995 | Pickard |
| 5,477,848 A | 12/1995 | Reed |
| 5,743,330 A | 4/1998 | Bilotta |
| 5,788,152 A | 8/1998 | Alsberg |
| 5,930,962 A | 8/1999 | Sokolean |
| 6,073,407 A | 6/2000 | Sokolean |
| 6,270,016 B1 | 8/2001 | Fiedrich |
| 6,283,382 B1 | 9/2001 | Fitzemeyer |
| 6,330,980 B1 * | 12/2001 | Fiedrich ........................ 237/69 |

FOREIGN PATENT DOCUMENTS

| | | |
|---|---|---|
| CA | 2078185 | 12/1993 |
| CA | 2158302 | 8/2001 |
| DE | 3412882 | 10/1985 |

* cited by examiner

*Primary Examiner*—Terrell McKinnon

(57) ABSTRACT

A heat distribution panel which utilizes an extruded tubing receptacle having a tube receiving channel for tightly gripping the heat tubing throughout the serpentine course of continuous tubing including the straight and curved or looped ends of the parallel straight runs. The tubing receptacle is an extruded cross section of minimum thickness with a plurality of planar surfaces for heat transfer to thermally conductive heat transfer plates or other thermally conductive materials. Curved end sections or components of the receptacle may be formed utilizing existing bending equipment without effecting the function of the receptacle channel. Sheet metal heat transfer plates may be attached to the essentially planar surfaces of the tubing receptacle with a suitable heat conductive adhesive or adhesive tape. The sheet metal plates may be attached either directly to the bottom face of the tube receptacle or sheet metal plates having angled edge portions may be adhered to side surfaces of the receptacle so as to extend heat transfer plate portions outwardly therefrom. Alternatively the flat surface areas of the tube receptacle may be used for attachment to any flat thermally conductive surface with a variety of mechanical fasteners.

36 Claims, 10 Drawing Sheets

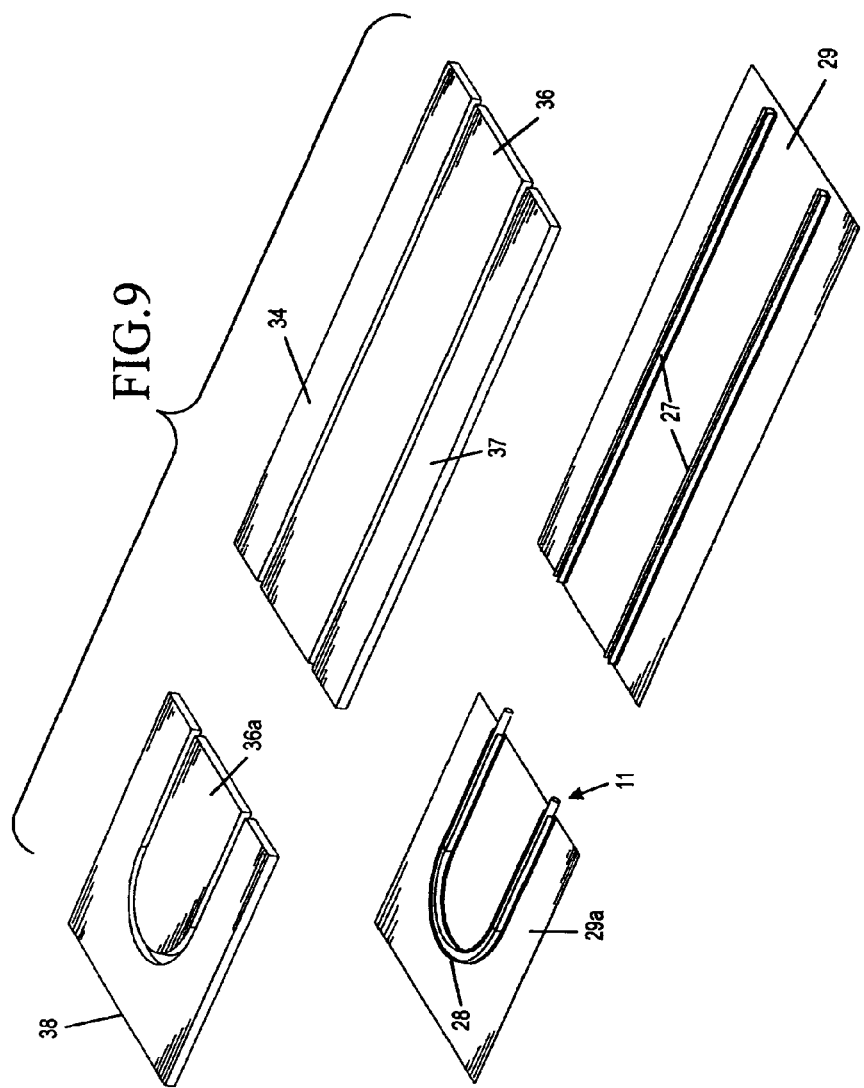
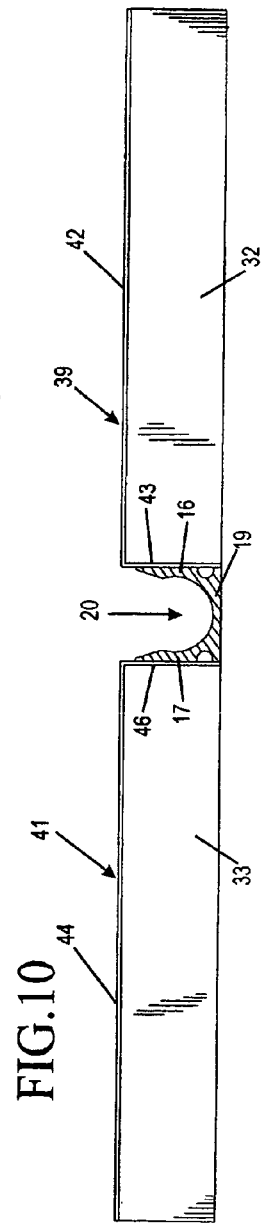

HYDRONIC RADIANT HEAT TUBING RECEPTACLE AND HEAT DISTRIBUTION PANEL SYSTEM

CROSS REFERENCE TO RELATED APPLICATION

The present application is a continuation of the application entitled "Hydronic Radiant Heat Tubing Receptacle And Heat Distribution Panel System", filed May 7, 2003, abandoned Ser. No. 10/434,520.

BACKGROUND OF THE INVENTION

1. Field of the Invention

The present invention relates to hydronic floor, wall and ceiling heating systems for heating an enclosed space by circulating a heating fluid through a tubing system and more particularly to an improved heat tubing receptacle or channel and novel cooperation with surrounding thermally conductive surfaces.

2. Description of the Prior Art

In general, hydronic radiant heating systems are well known in the prior art and typically include means for circulating heating fluid, usually hot water, through a system of flexible heating pipes or tubes embed in either the floor, wall or ceiling of the room to be heated. These systems usually include some form of heating tube holder and a heat transfer medium, in the form of heating plates or fins to spread the heat from the tubing and receptacle to a surrounding thermally conductive area. Several methods for supporting the heating tubes and enhancing heat transfer are available, including extruded tube receptacles constructed from thermally conductive materials such as copper or aluminum with integral wings or plates for transferring heat to the surrounding area. Other systems rely on channels formed in sheet metal with planar wings or the like for spreading the heat. Still others rely on a combination of extruded cross sections and sheet metal components to make up the heat distribution panel. The McCall U.S. Pat. No. 4,624,242 and the Reed U.S. Pat. No. 5,477,848 are examples of the latter type of construction wherein extruded cross sections are utilized in combination with sheet metal components to make up the heat distribution panel. Examples of the use of extruded cross sections for both mounting the heat tubing and providing integral heat transfer plates located in different positions on the tube retaining channel are the Billota et al U.S. Pat. No. 5,743,330 and the Fitzemeyer U.S. Pat. No. 6,283,382, both of which utilize a retention channel with a semicircular cylindrical inside surface for holding a round heating tube. Applicant's own prior U.S. Pat. No. 5,454,428 is directed to a heat distribution panel and system wherein an extruded module includes integral side fins or heat transfer plates with an elongated tubing receptacle. According to my prior patent, the tubing receptacle includes an elongated tube-receiving space having an inner wall with a circumference extending through an arc greater than 180° with guide ways extending outwardly divergent therefrom for initially guiding the tubing into the tube receiving space. With the use of plastic deformable tubing having an outside diameter nominally the same as the diameter of the tube receiving space, the tubing is easily snapped into the channel with full surface contact between the wall of the tubing and the inner walls of the receptacle. Full surface contact thus eliminates air gaps so as to provide for optimum heat transfer between the tubing and the receptacle walls essentially by conduction. Surface contact between the tubing and receptacle walls may even be enhanced by the internal pressure in the tubing created when heating fluid is circulated. Because the tube receiving wall of the receptacle closely matches the circular shape and diameter of the tubing, once the tubing is in place, it will strongly grip the tubing without the need for glues, adhesives, sealants, filler material or other fasteners.

The Canadian Patent No. 2,078,185 to Joachim Fiedrich is illustrative of still another method of supporting the hot water tubing. In this patent, the tubing is confined in slots formed between wood sleeper panels, see FIG. 6, with a compliant caulking or epoxy adhering the tubing within the channel between the wood sleeper panels and in tangential contact with an overlying radiant plate.

The prior art heat distribution panels or modules, including the tube holding extrusions and heat transfer plates, are configured so as to engage the heating tubes only in the linear runs. Thus, when the heating system is assembled with the continuous heating tube lay-out in a generally serpentine pattern, no provision is made for tube retention or heat transfer enhancement along the curved sections of the heating tube which may even be left exposed if installation is made beneath existing floors. Alternatively the tubes may be contained in grooves in wooden sleeper panels at the ends of parallel straight runs of the tubing. In recent years, plastic tubing such as polyethylene or polybutylene has come into wide use for hot water circulation in radiant heating systems in nearly all types of building structures. A demand has thus arisen for not only less expensive radiant heat distribution panel systems but also for more efficient heat transfer methods, especially in private home construction.

SUMMARY OF THE INVENTION

The present invention provides an improved heat distribution panel which utilizes a novel extruded tubing receptacle having a tube receiving channel for tightly gripping the heat tubing throughout the serpentine course of continuous tubing including the straight and curved or looped ends of parallel runs. The tubing is received and retained by a snap-fit in the receiving channel for heat transfer directly to the tubing receptacle essentially by conduction rather than convection. The tubing receptacle is a cross section of minimum thickness and configured so as to reduce the cost of the extrusion while presenting a plurality of planar surfaces for heat transfer to thermally conductive surfaces and/or for the attachment of heat transfer plates constructed from aluminum or other efficient thermally conductive sheet metal materials. With the extruded cross section of the tube receptacle, the plastic tubing when retained in the receiving channel is held out of contact with adjacent surfaces along its exposed top surface which is not contacted by the tube receiving channel. This structure reduces noise levels usually experienced by differential expansion and contraction of the heating elements. With the cross section of the tubing receptacle according to the present invention, it has been found that curved end sections or components of the receptacle may be formed utilizing existing pipe bending equipment without affecting the function of the receptacle channel.

Sheet metal heat transfer plates may be held against or permanently attached to the essentially planar outside surfaces of the tubing receptacle with a suitable adhesive or adhesive tape, preferably of the heat conducting type, for thermal conductivity. The sheet metal heat transfer plates may be either flat or have angled edge portions contacting the planar surfaces of the receptacle. Alternately, heat transfer plates having flat surfaces may be fastened by mechanical means to the planar flat surfaces of the tubing receptacle for thermal conductivity. For other constructions, the tube receptacle presents ample flat surface areas for simple attachment to any flat (typically thermally conductive) surface with a variety of mechanical fasteners such as rivets, pins, screws, as well as with adhesives, including those in tape form or may also be simply held in close engagement with a flat surface for thermal conductivity.

BRIEF DESCRIPTION OF THE DRAWINGS

FIG. 9 is an exploded view similar to FIG. 8 utilizing a modified arrangement of sheet metal heat transfer plates and sleeper panels;

FIG. 10 is an elevational view illustrating the tubing receptacle with sheet metal heating transfer plates adhesively bonded to planar side faces thereof;

DESCRIPTION OF THE PREFERRED EMBODIMENTS

According to the present invention, a novel heating tube receptacle is provided which has an extruded cross section that enables the attachment of flexible tubing or pipe to a flat surface for efficient thermal conductivity. The heating tube receptacle is especially adapted to hold flexible non metallic tubing and provides an efficient path for heat transfer from a hot water stream such as utilized in radiant heating systems of all kinds to flat, thermally conductive surfaces of all kinds. The extruded flexible tube receptacle is adapted specifically to thermally reconcile the round, cylindrical shape of pipes and tubing with the increased area of predominantly flat shapes such as fins, panels, plates etc. which are needed to move heat from the heat transfer fluid into a panel heating application. To this end, a radiant heat distribution panel system is provided utilizing an extruded tubing receptacle cross section 10, FIGS. 1–6, for receiving and gripping a flexible hot water tube 11, with the tube receptacle being adapted for contact with or attachment to a thin walled heat transfer plate or fin. Filler panels, known in the art as "sleepers", are utilized to cooperate with the tube receptacle and heat transfer plates to adapt the assembly for incorporation into flooring systems, such as between the sub flooring and a finished flooring layer. It will be understood, of course, that the tubing receptacle, either with or without the heat transfer plate, may be used to successfully mount the flexible tubing directly to any flat surface area for thermal conductivity.

Figure 3:
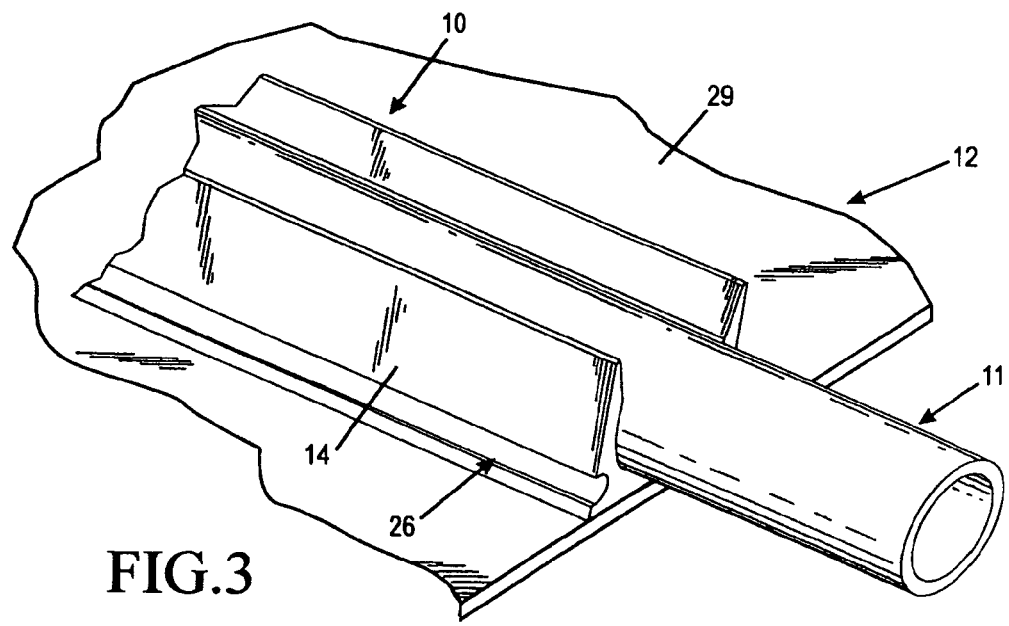
FIG. 3 is a detailed perspective illustrating the tubing in place in the straight section of the tube receiving channel.
Figure 4:
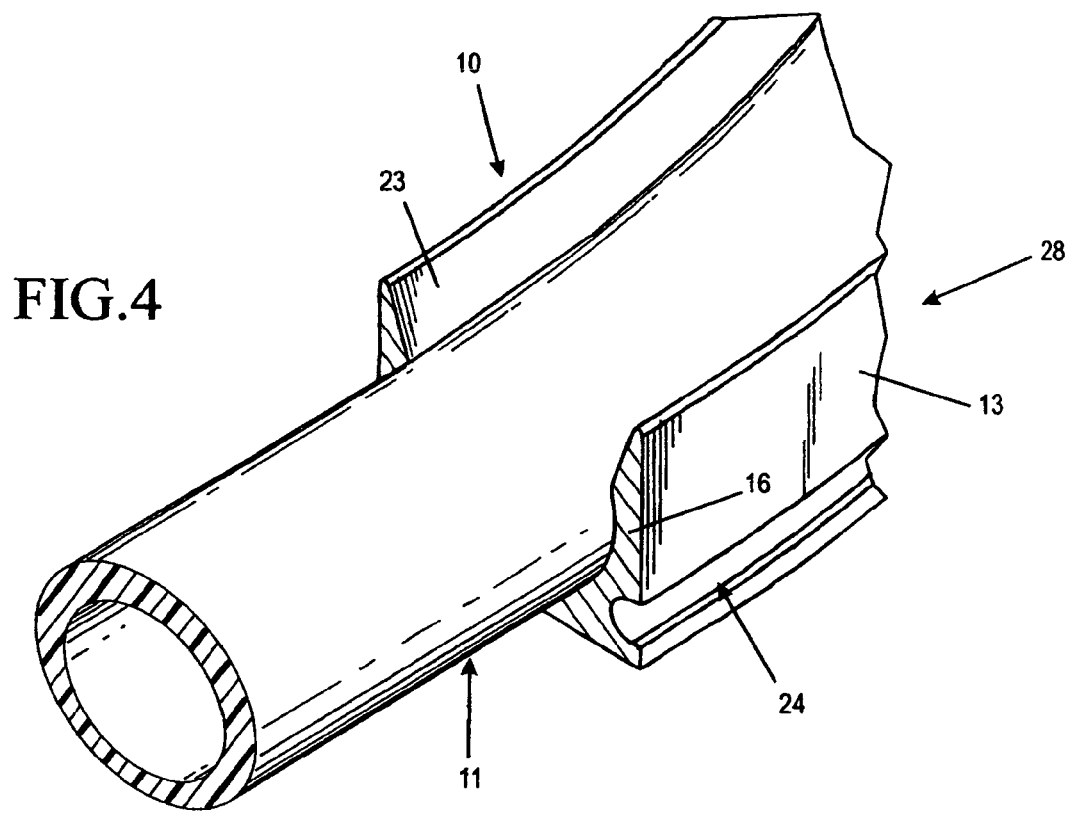
FIG. 4 is a partially sectioned perspective view showing the heating tube within the receiving channel of a curved section of the tubing receptacle.
Figure 5:
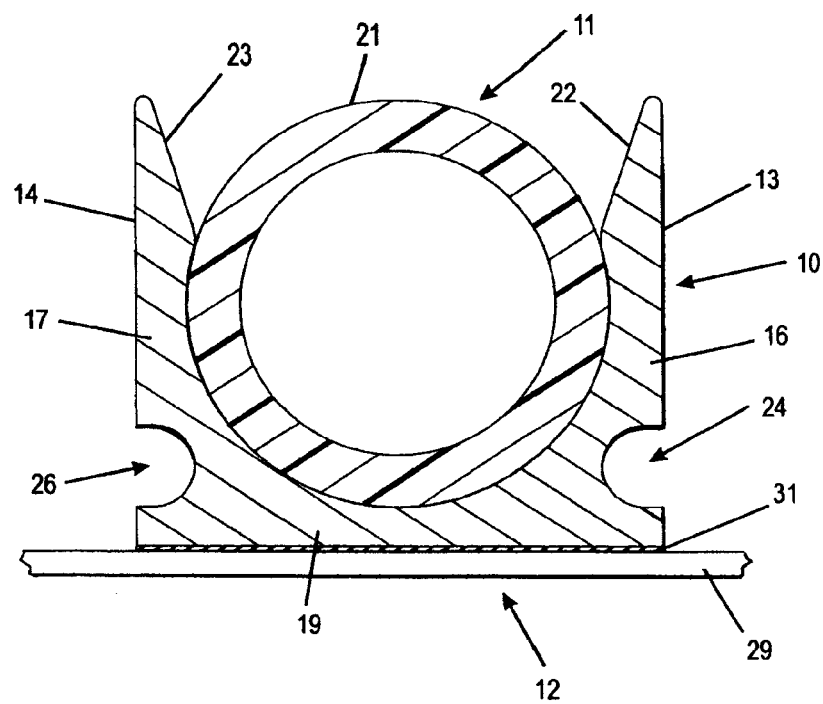
FIG. 5 is a cross sectional view illustrating the heat tube in the tube receiving channel.
Figure 6:
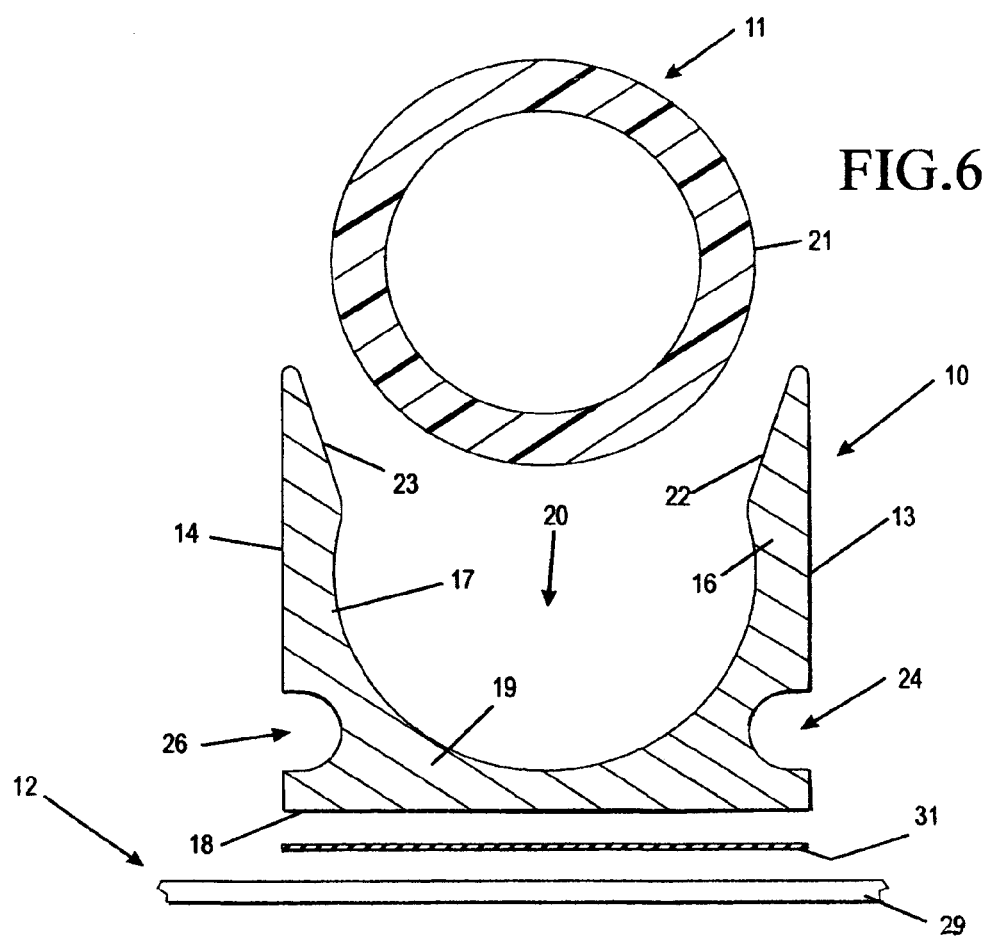
FIG. 6 is an exploded view illustrating the heating tube ready for insertion into the tube receiving channel of the receptacle.

Referring to FIGS. 5 and 6, the tubing receptacle 10 in the present embodiment consists of an aluminum extruded cross section having a generally square or rectangular peripheral outline which includes the flat side wall surfaces 13 and 14 of the side wall members 16 and 17 respectively and a flat bottom wall surface 18 of the bottom wall 19. The top area of the receptacle, of course, is open to receive the flexible tubing 11 as shown in FIGS. 5 and 6. Since it would be possible to orient the receptacle in any position, the term "top" will be understood to mean the open side used for inserting the tube with the term "bottom" describing the side opposite thereto. The tubing receptacle 10 provides a channel or guide way 20 which contains a locus of points defining a semicircular pattern in cross section and has a diameter nominally identical with that of the outside diameter of surface 21 of the flexible tubing 11. The preferred degree of wrap about the tubing surface 21, in the engaged position shown in FIG. 5, being in the order of 200° (so as to be greater than 180°). The upper ends of the side walls 16 and 17 as shown in FIGS. 5 and 6 terminate in guide surfaces 22 and 23 which are planar and acutely sloped from the vertical to provide a guide way to facilitate initial positioning of the plastic tubing into the channel. The flexible tubing is slightly deformable and may be forced into the channel and locked therein by a snap-fit due to engagement with the receptacle walls. The extruded receptacle thus strongly grips the radiant tubing without the need for glues, adhesives, sealants, compliant filler materials or other fasteners. The extrusion wall thickness is held to a minimum necessary to rigidly grip the radiant tubing. The channel portion of the receptacle 10 which engages and tightly grips the flexible tubing 11 may be constructed in accordance with the teachings of my prior U.S. Pat. No. 5,454,428 so as to function in the manner described therein. According to the present invention, the sides 16 and 17 of the extrusion are sized so that the upper or outer ends thereof extend slightly beyond the surface of the flexible tube once installed as shown in FIGS. 3–5. This clearance allows other materials to bridge the open side of the extrusion without directly contacting the tubing so as to prevent abrasion or production of undesirable noise resulting from the differential expansion of materials. Also, according to the present invention, the geometric configuration of the extrusion 10 is optimized with respect to material use so as to reduce the cost of the extrusion. The shape of the extrusion maximizes the practically useful flat areas for heat exchange while minimizing the amount of aluminum utilized by holding the extrusion wall thicknesses to a minimum necessary to grip the radiant tubing and by removing material such as at the longitudinal grooves 24 and 26 formed as negative areas during the extrusion process.

Figure 1:
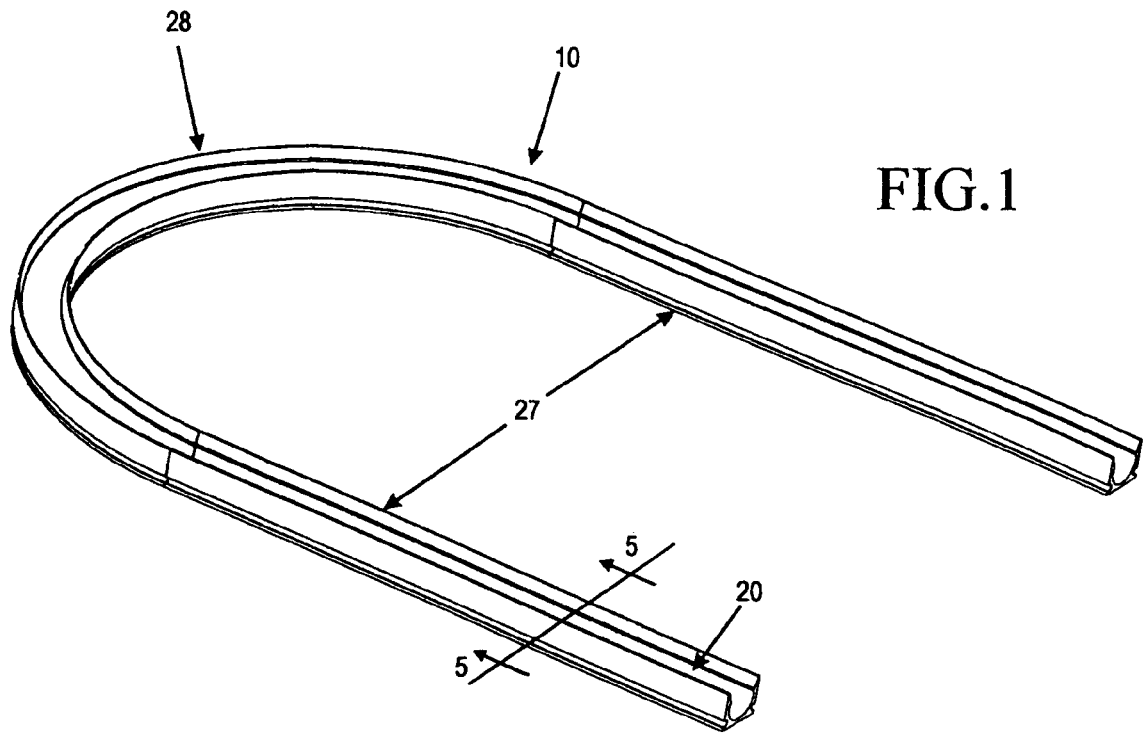
FIG. 1 is a perspective view of a tubing receptacle including straight parallel runs and a curved section.
Figure 2:
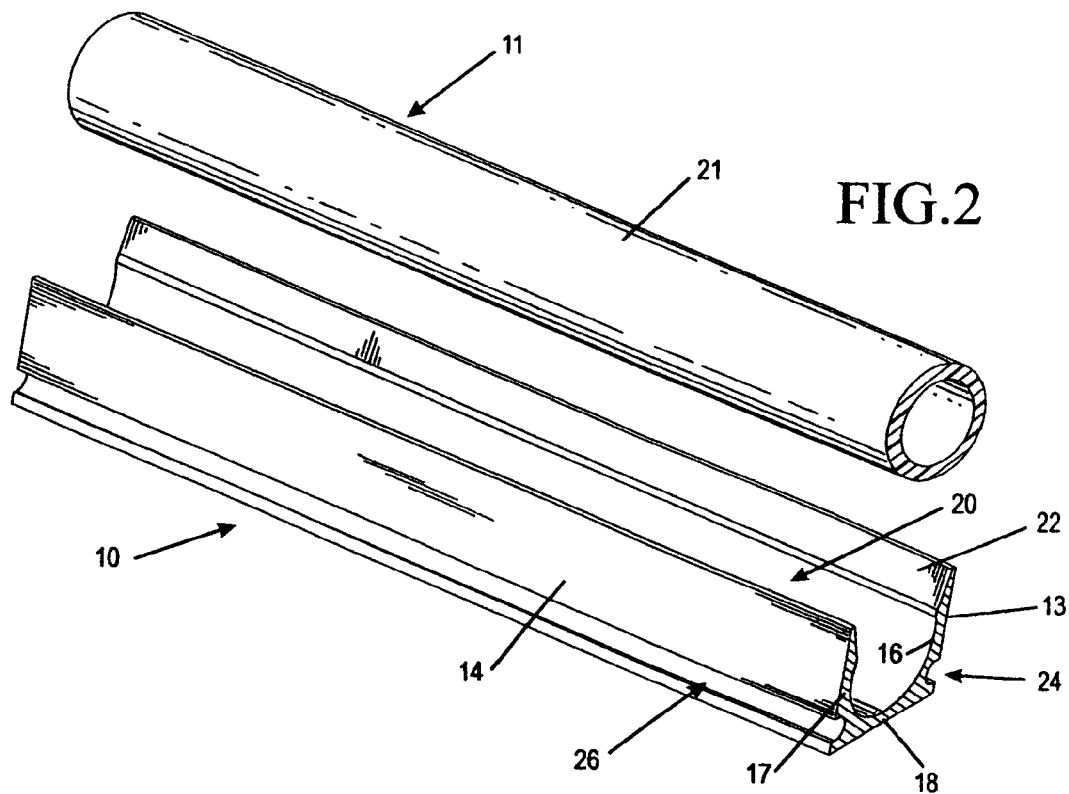
FIG. 2 is an exploded view of a straight section of the tubing receptacle and the non-metallic heating fluid tubing.

As will be described more in detail relative to FIGS. 15 and 16, it is common practice to utilize a serpentine layout of hot water tubing for heating large surface areas such as the floor of an entire room. In this arrangement, a continuous flexible heating tube is utilized for circulating hot water, thus requiring both parallel linear runs and curved or looped end sections in the serpentine pattern. Prior art extruded tubing receptacles normally make no provision for curved tubing sections which may be left exposed or, in some instances, contained in grooves in wood sleeper panels. This practice, of course, sacrifices the retention function of the tubing receptacle and results in significant heat losses or at least a severe drop in the efficiency of the thermal conductivity of the system. The extruded section 10 of the present invention utilizes a generally square or rectangular peripheral outlined cross section which is adapted to be fabricated in curvilinear sections up to 180° or more directional change. With this configuration, as seen in looped end of the tube 11. The parallel linear sections 27 and curved end section 28 will be affixed in place in the heat distribution panel assembly and the flexible tube 11 may be simply snapped in place to pass continuously from the linear sections through the curved section, as seen in FIGS. 1, 3 and 4. It has been found that, with a symmetrical thin walled construction of the extruded tubing receptacle and the essentially square or rectangular peripheral outline configuration, the receptacle can be formed in relatively tight curvatures without significant distortion of the circular cross section of the channel. Utilizing existing equipment, a receptacle may be formed in 180° bends to accommodate a continuous serpentine layout of heating tubing. Up to 180° bends have been fabricated with 5–6 inch radii for accommodating ⅝ inch O.D. flexible tubing, and with 4 inch radius for accommodating ½ inch O.D. flexible tubing. These tube sizes and bend radii are well within the parameters of conventional radiant heating panel systems for floor, ceiling and wall construction.

Figure 7:
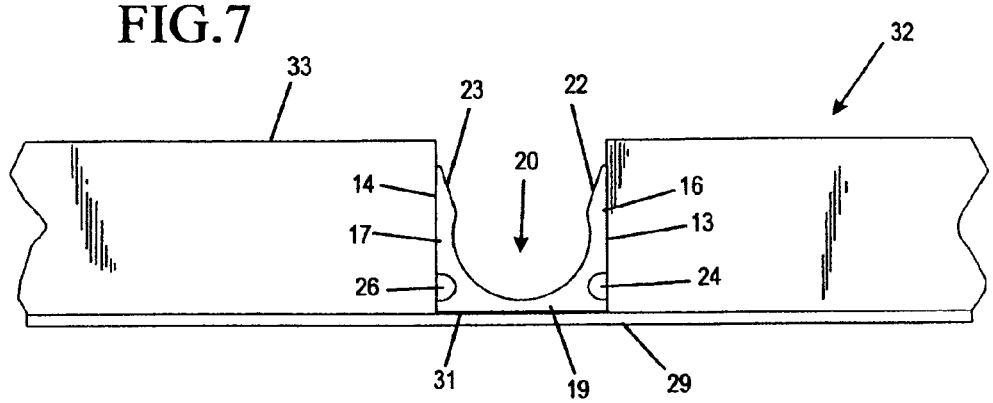
FIG. 7 is an elevational view illustrating the tubing receptacle with a heat transfer plate adhesively bonded to the bottom planar face.
Figure 8:
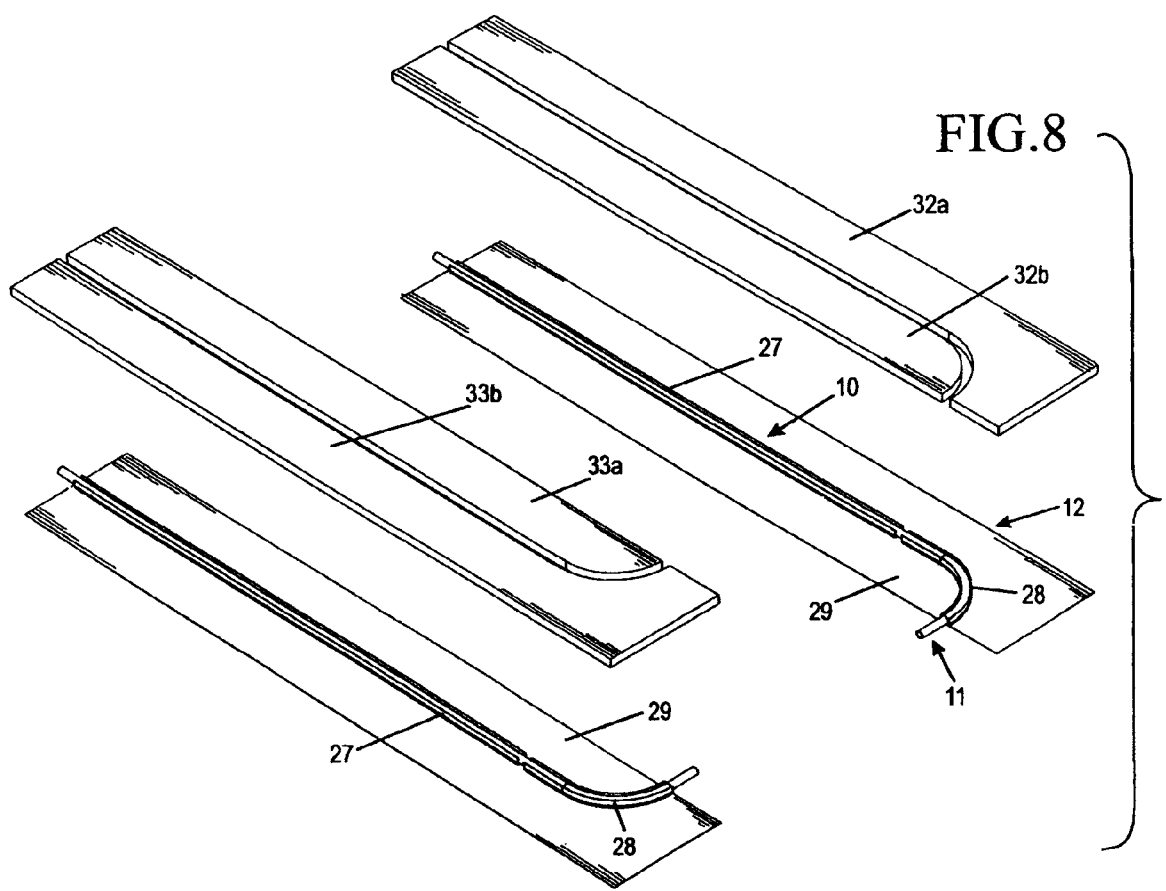
FIG. 8 is an exploded view illustrating the assembly of a heat distribution panel including straight and curved sections of the tubing receptacle and sleeper panels.

Referring particularly to FIGS. 3, and 5–7, a heat transfer plate 29 can be fabricated from any inexpensive thin sheet metal having efficient thermal conductivity such as aluminum or copper with aluminum being preferred because of cost. As shown in FIG. 6, when permanent attachment is desired, the plate 29 may be fastened to the bottom surface 18 of the extruded cross section by means of an adhesive layer 31 which may comprise any one of many suitable commercially available adhesives. The layer 31 may also be in the form of an adhesive tape, available in the range of 2 mil thickness, which provides a lasting permanent bond especially between aluminum surfaces with little or no resistance to thermal conductivity. One such adhesive tape is commercially available as Very High Bond (VHB) F-9460PC manufactured by the 3M company. Other adhesives and tapes are available commercially and, as previously pointed out, other mechanical means for attaching the transfer plate 29 to the surface of the pointed out, other mechanical means for attaching the transfer plate 29 to the surface of the extrusion, such as rivets, pins, screws, etc. may be utilized. In some construction environments, the face of the extrusion may simply be tightly held in place against the heat transfer plate by surrounding members with no other attachment required. The utilization of adhesives either in tape form or otherwise, however, is the preferred method when assembling heat distribution panels for floors or wall surfaces in most structures. As seen in FIG. 7, any form of sleeper panels 32 and 33, normally plywood or particle board may be placed so as to overlie the heat transfer plate 29 on each side of the tubing receptacle with the edges of the sleepers being snugged directly against the planar side surfaces 13 and 14 of the extruded tube receptacle. This assembly comprises the heat distribution panel which would normally be place on sub flooring or the like and then covered with finished flooring boards in a conventional manner. FIGS. 8 and 9 are exploded views illustrating typical layouts for assembling the components of the heat distribution panel according to the present invention. Referring to FIG. 8, the tube receiving receptacles 10 having the parallel linear sections 27 and curved in sections 28 are adhered to transfer plates 29 in the manner previously described. In this instance, the heat transfer plates comprise separate strips for each linear run 27 of the tubing receptacle which are laid side-by-side to form one looped run of the serpentine tubing system. Likewise, the curved end sections 28 are formed in separate 90° bends which, when assembled, provide the 180° end loop configuration for the heat tubing. The tubing 11 will be snapped in place into the receptacles 27, 28 once they are assembled to form one loop of a tubing system. In a similar manner, the sleeper panels are sectionalized so as to be laid against each tubing receptacle once it is in place. Thus, the sleepers in this arrangement comprise separate sections 32*a*–*b* and 33*a*–*b* which are laid between and on either side of the tubing receptacles to form the heat distribution panel.

FIG. 9 is an exploded view illustrating a slightly modified version of the panel layout wherein the single sheet metal heat transfer plate 29 is utilized to mount the two parallel linear tubing receptacle sections 27 and a second sheet metal heat transfer plate 29*a* is utilized to mount the curved end section 28 of the receptacle such that, when assembled, the full looped end of a serpentine tubing system is accommodated. Once the receptacle is in place, tubing can be snapped into the continuous extruded channel in the manner described. The sleeper panels in this embodiment comprise the parallel sections 34, 36 and 37 for filling between and on either side of the straight runs 27 of the receptacle. The looped end of the serpentine system would be accommodated by a central section 36*a* and the surrounding end section 38. It will understood, of course, that the sectionalizing of the components of the heat distribution panel may be varied to fit different construction methods without departing from the scope of the present invention. It will also be understood that the plate 29 may be varied in terms of dimensions and orientation and could be attached to the side surface 13 and 14 if desired for any heat transfer configuration.

FIG. 10 illustrates a second embodiment of the method for attaching heat distribution plates to the extruded receptacle. In this embodiment, the sheet metal heat transfer plates 39 and 41 include horizontal sections and right angular vertical sections for attachment to the side surfaces 13 and 14 of the extruded tubing receptacle. The plate 39 includes the horizontal section or wing 42 and right angular vertical section or leg 43. Similarly, the panel 41 includes the horizontal section or wing 44 and the vertical section or leg 46. The vertical sections or legs 43 and 46 may be adhesively attached to the planar surfaces 13 and 14 of the legs 16 and 17 of the extrusion in a manner previously described relative to the transfer plate 29. In the FIG. 10 arrangement, sleepers 32 and 33 will be mounted beneath the horizontal sections of transfer plates 42 and 44 respectively and against the legs 43 and 46 of the heat transfer panels. The entire distribution panel including the extrusion 10, distribution panels 39 and 41 along with sleepers 32 and 33 may be mounted between the sub flooring and the finished floor surface as previously described.

Figure 11:
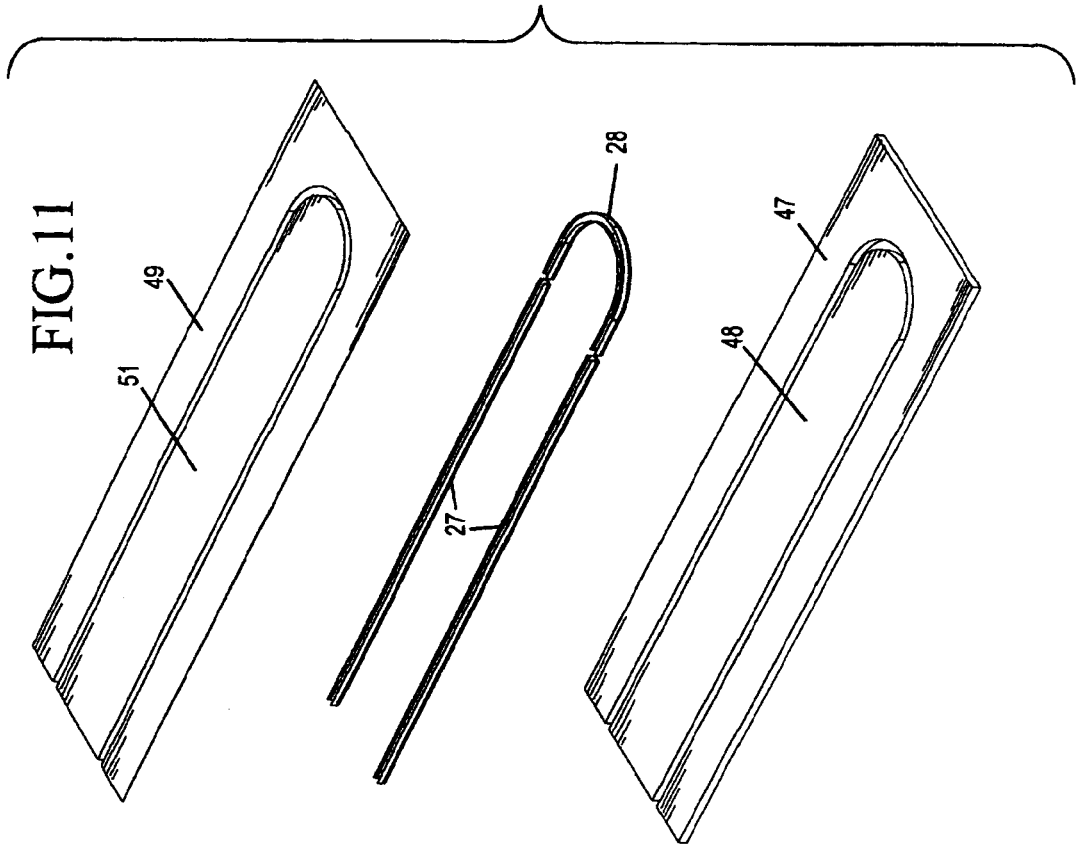
FIG. 11 is an exploded view illustrating the assembly of a tubing receptacle into engagement with a sleeper panel and a sheet metal heating transfer plate according to the embodiment of FIG. 10.

FIGS. 11–14 illustrate several embodiments of the heat distribution panel assembly utilizing the panel construction illustrated in FIG. 10. Referring first to FIG. 11, a single loop of the tubing receptacle may be received in the two-piece sleeper panel 47–48 and the two-piece heat transfer panel 49–51, each piece having horizontal and vertical sections as illustrated, will be placed with the horizontal sections overlying the sleeper panel sections and the vertical sections of the transfer panel contacting the planar side faces of the tubing receptacle as previously described.

Figure 12:
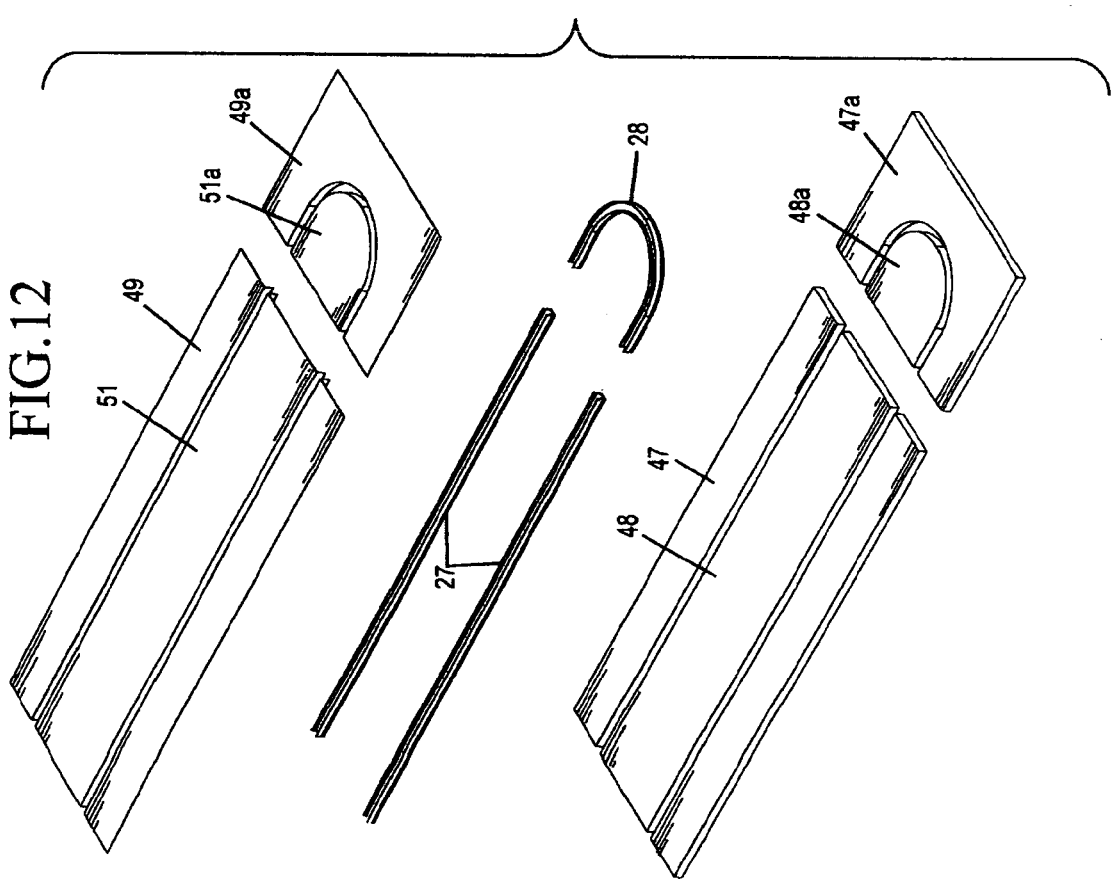
FIG. 12 is an exploded view similar to the FIG. 11 of an embodiment utilizing a modified form of sleeper panel, tubing receptacle and heat transfer plate including straight and curved runs for the heating tube.
Figure 13:
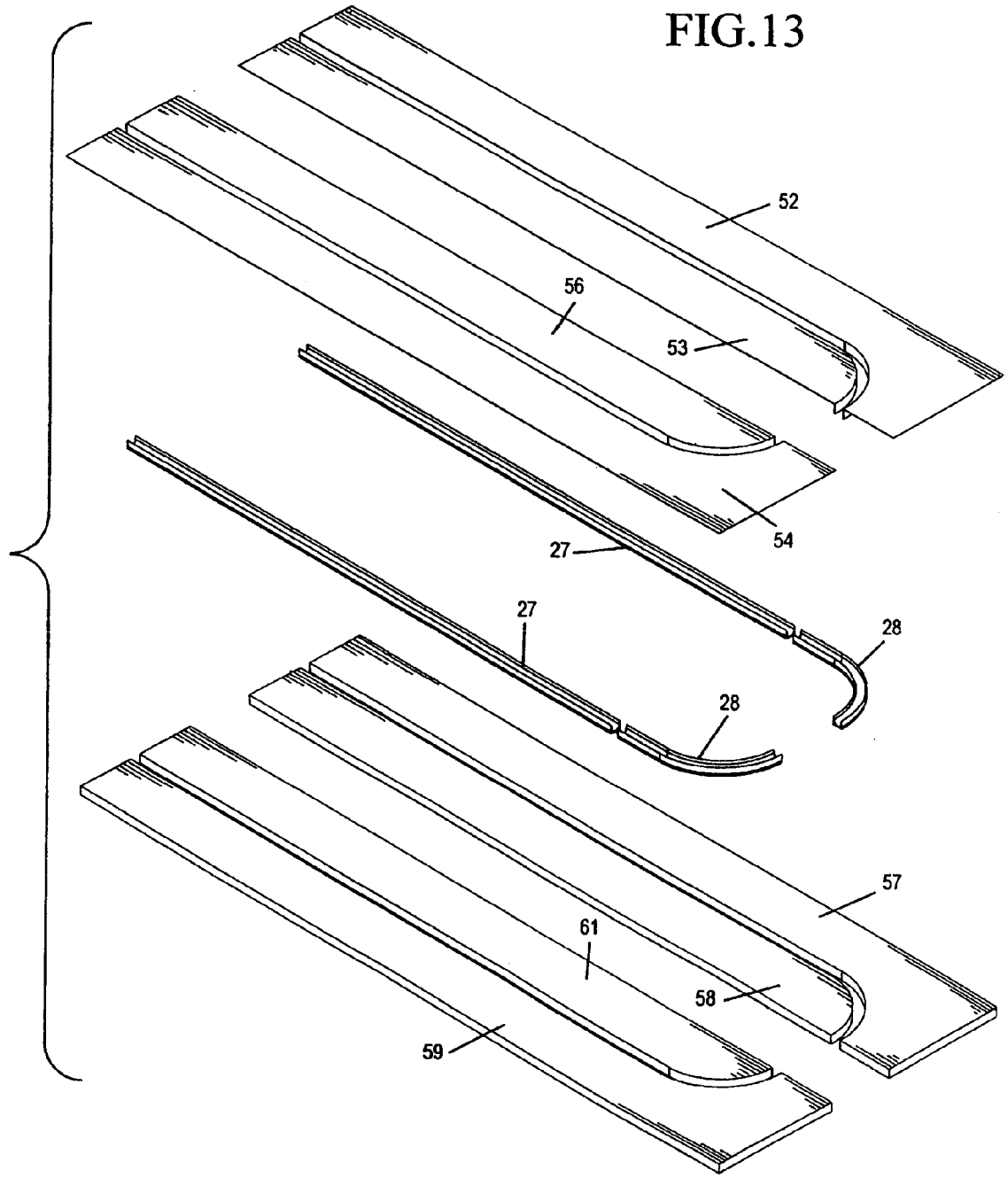
FIGS. 13 and 14 are exploded views similar to FIGS. 11 and 12 utilizing modified forms of sleeper panel for tubing receptacle and heat transfer plate configurations.

FIG. 12 is an exploded view similar to FIG. 11 illustrating a modified configuration of transfer plate and sleeper panels. A four-piece arrangement of the plates 49–49a and 51–51a as well as sleeper panels 47–47a and 48–48a is utilized for cooperation with the tube receptacle. FIG. 13 is an embodiment similar to FIG. 11 wherein separate sets of sheet metal heat transfer plates are provided for each of the parallel straight runs and curved end of the tubing receptacle. The plate pair 52–53 may thus be mirror images of the transfer plates 54 and 56. Likewise, the sleeper plates 57 and 58 may be mirror images of the sleepers 59 and 61.

Figure 14:
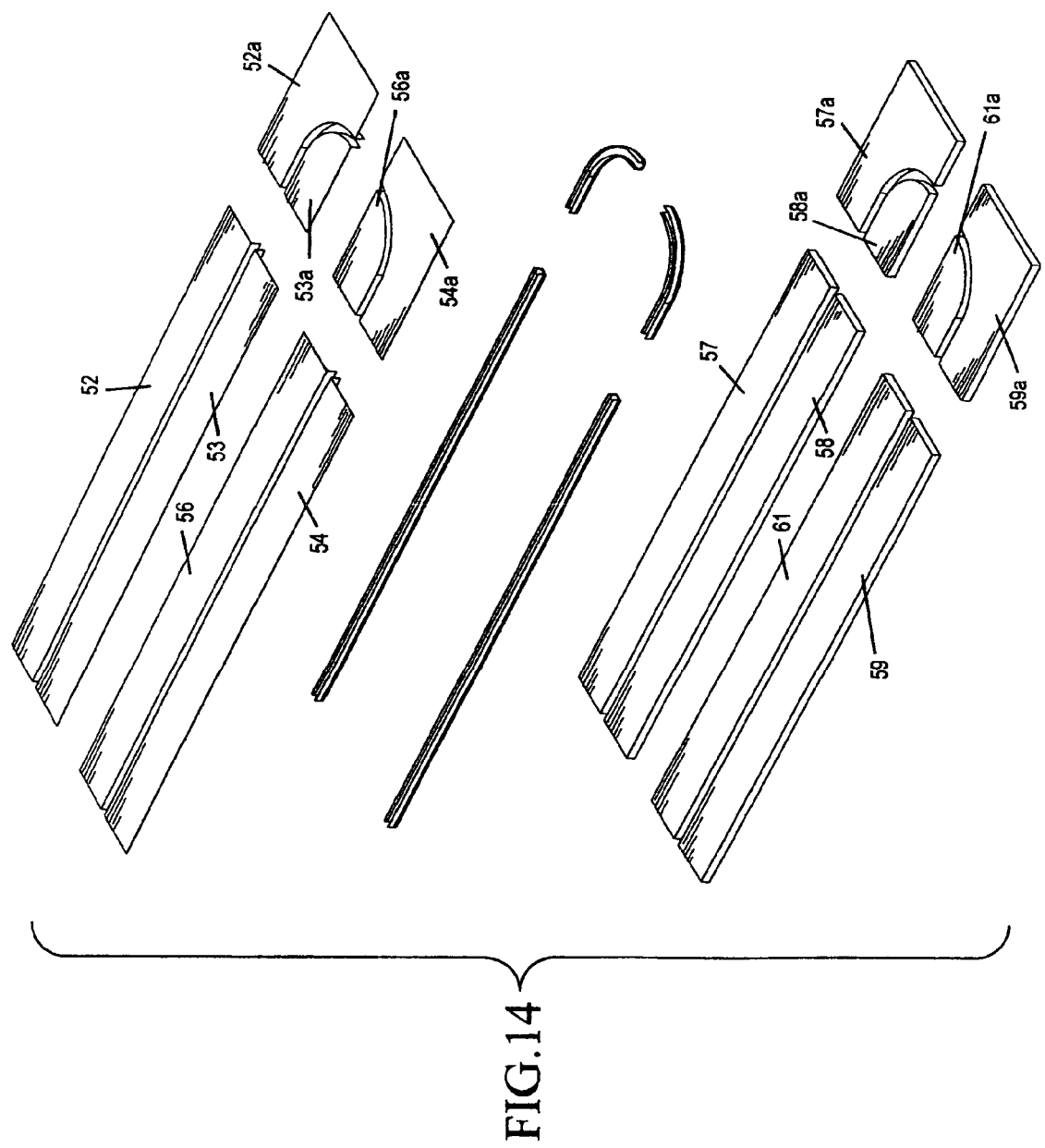

FIG. 14 is still another modification on the configuration of transfer plates, tubing receptacles and sleeper panels. FIG. 14 is similar to FIG. 13 except for the separation of transfer panels 52 and 53 laterally to form separate sections 52a and 53a and with the heat panel sections 54 and 56 being separated into panel sections 54a and 56a. Similarly the sleeper panels 57 and 58 have been laterally separated into four sections 57–57a and 58–58a with the sections 59 and 61 being separated into sections 61–61a and 59–59a respectively. The function of the heating panel and order of assembly is otherwise the same. Although the preferred embodiment of FIG. 10 utilizes right angle vertical and horizontal plate sections it would, of course, be possible to utilize a lesser or greater angular disposition between the plate sections. Likewise, it would be possible to extend the horizontal portions or wings outwardly from any position along the sides of the receptacle without departing from the spirit and scope of the invention. In some instances it may also be desirable to attach the plates 39 or 41 to the bottom surface 18.

Figure 15:
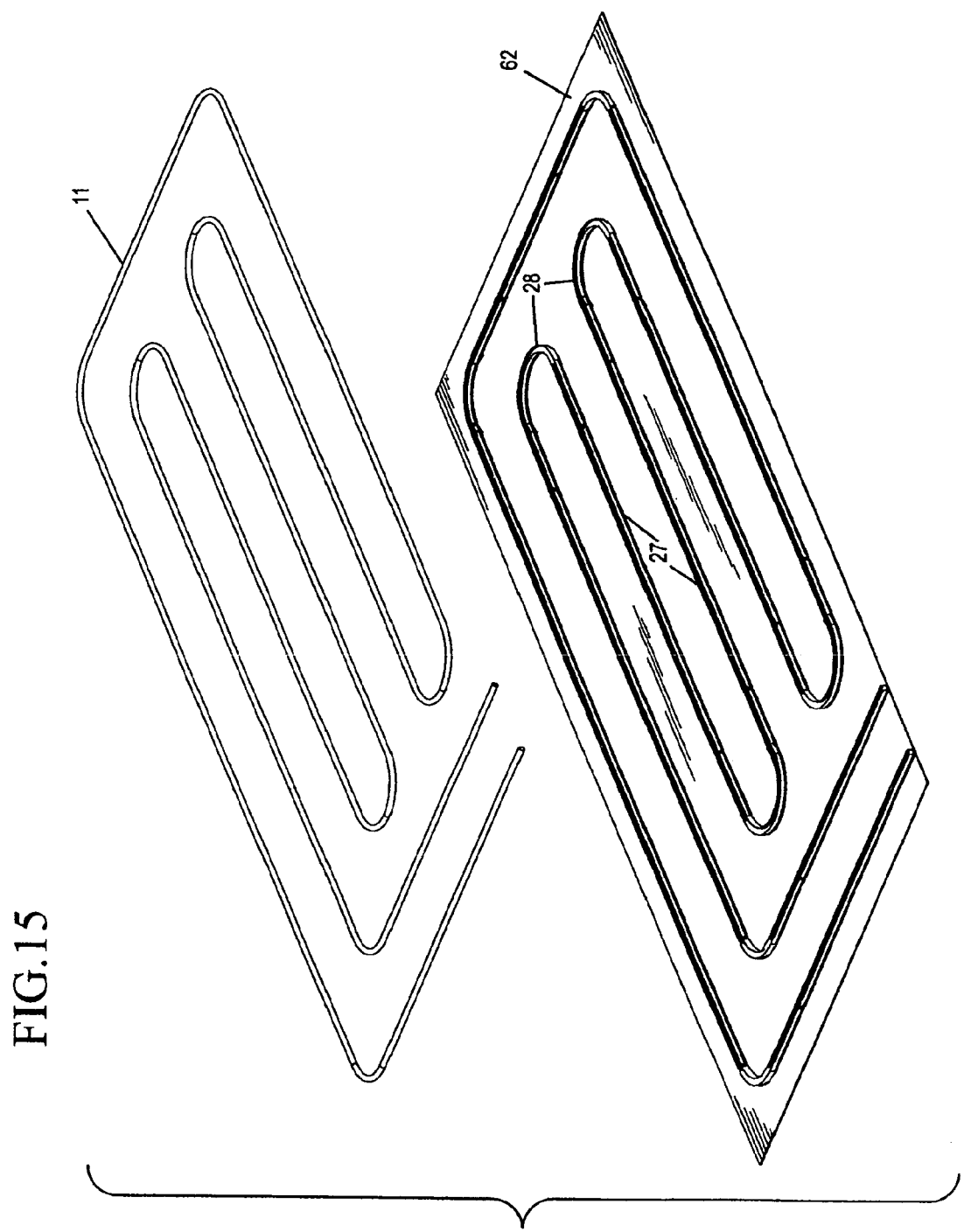
FIG. 15 illustrates a radiant heat system having straight and curved sections of tubing receptacle and heat transfer plates with a continuous heating tube ready for insertion into the tubing receptacle.
Figure 16:
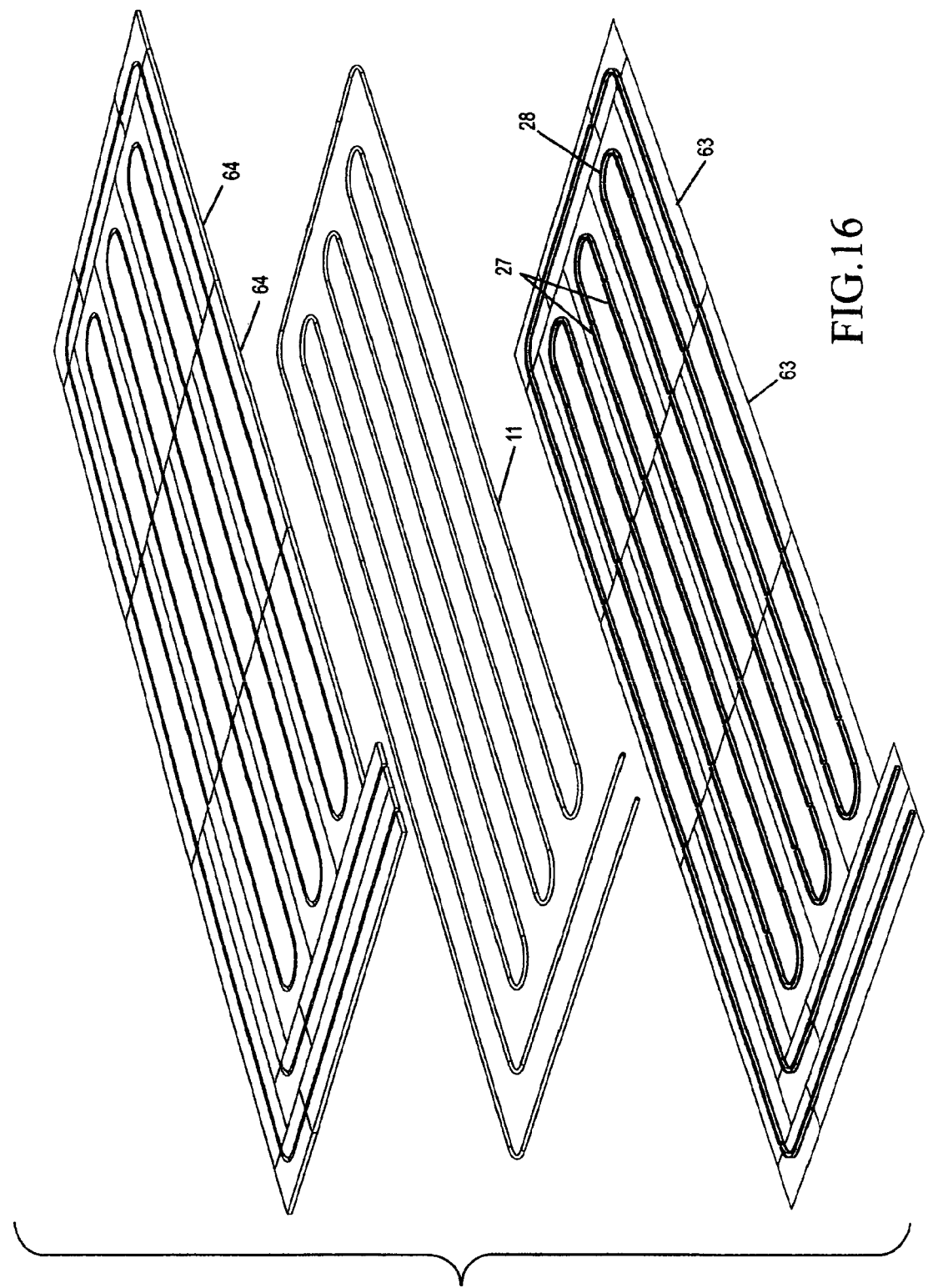
FIG. 16 illustrates a radiant heat system similar to FIG. 15 with the tubing receptacle and heat tubing including a serpentine configuration with sleeper panels for installation about the tubing receptacles.

FIGS. 15 and 16 illustrate typical layouts for heat tubing in a continuous serpentine pattern for coverage of a wide area utilizing the tubing receptacle of the present invention with both parallel linear runs and curved sections for complete containment of the heating tube. As shown in FIG. 15, a single sheet metal heat transfer plate is used for the entire serpentine pattern and is of the type either fixed to or adjacent the bottom planar surfaces 18 of the tubing receptacle sections. FIG. 16 illustrates a similar layout wherein a plurality of heat transfer plates are attached to the bottom planar faces of the receptacle sections 27 and 28 to cover the entire area beneath the serpentine pattern. The continuous heating tube 11 is snapped into place in the continuous channel provided by the receptacle sections 27 and 28 with the sectionalized sleeper panel segments spanning the spaces between the tubing receptacle sections in the manner previously described. It will be apparent that different patterns of unitary and sectionalized arrangements of tubing receptacles, heat transfer plates and sleeper panels may be utilized for both the FIG. 7 and FIG. 10 heating plate and tubing receptacle connecting means. It is also apparent that the tubing receptacle could be mounted directly onto any thermally conductive surface by such expedients as attaching the tubing receptacle directly to the underside of existing flooring or by such means as nailing or stapling the attached heat transfer plates against such surfaces.

While preferred embodiments of the invention have been described herein, variations in the design may be made. The scope of the invention, therefor, is only to be limited by the claims appended hereto.

What is claimed is:

1. A receptacle for mounting a heating tube comprising;
    an elongated metal extrusion having thin receptacle walls with a cylindrical inside surface including a locus of points defining a semicircular pattern in cross section and configured to receive said heating tube, said walls forming a thermal channel for snap-fit retention of said heating tube and an outside surface comprising a plurality of planar outside surface sections,
    said receptacle walls being uninterrupted by any substantial outwardly directed extensions beyond the surfaces of said planar surface sections,
    said receptacle having a cross section substantially symmetrical about a vertical centerline, and
    said outside surface sections conducting heat from said heating tube to adjacent thermally conductive surfaces.

2. The receptacle of claim 1 wherein the inside surface of said thermal channel is held in full surface-to-surface contact with the surface of said heating tube for essentially conductive heat transfer.

3. A receptacle for mounting and retaining a heating tube comprising;
    an elongated rigid metal extrusion having thin receptacle walls with a semicircular cylindrical inside surface forming a thermal channel for snap-fit retention of said heating tube and an outside surface comprising a plurality of planar outside surface sections,
    said receptacle having a cross section which is generally rectangular in peripheral outline and substantially symmetrical about a vertical centerline with an open top side for reception of said heating tube,
    said outside surface sections conducting heat to adjacent thermally conductive surfaces.

4. The receptacle of claim 3 including;
    a heat transfer plate held in direct surface contact with at least one of said planar outside surface sections,
    said heat transfer plate extending outwardly from said receptacle for distributing heat to surrounding thermally conductive surfaces.

5. The receptacle of claim 4 wherein said heat transfer plate is adhesively bonded to said at least one outside surface section.

6. The receptacle of claim 5 wherein the outside surface sections of said receptacle include a bottom planar surface opposite to said open top side and immediately adjacent planar side surfaces.

7. The receptacle of claim 6 wherein said heat transfer plate is a flat sheet metal plate bonded to said bottom planar surface in full surface contact therewith.

8. The receptacle of claim 5 wherein said heat transfer plate includes an angularly disposed surface section bonded to said at least one outside surface section.

9. The receptacle of claim 3 wherein said extrusion comprises a curved receptacle having an arcuate thermal channel of essentially constant diameter nominally identical to the outside diameter of said heating tube for retaining said tube in an arcuate configuration in full surface-to-surface contact therewith,
    said open top side being arcuately disposed in a single plane for reception of said tube.

10. The receptacle of claim 7 wherein said extrusion comprises a curved receptacle having an arcuate thermal channel of essentially constant diameter nominally identical to the outside diameter of said heating tube for retaining said tube in an arcuate configuration in full surface-to-surface contact therewith, said open top side being arcuately disposed in a single plane for reception of said tube.

11. The receptacle of claim 8 wherein said extrusion comprises a curved receptacle having an arcuate thermal channel of essentially constant diameter nominally identical to the outside diameter of said heating tube for retaining said tube in an arcuate configuration in full surface-to-surface contact therewith, said open top side being arcuately disposed in a single plane for reception of said tube.

12. A radiant heat distribution panel comprising;

an extruded metal tube receptacle having an inside surface forming a thermal channel with an open top side for retaining a looped end section of a flexible heating tube in full surface-to-surface contact therewith, said receptacle including linear and arcuate sections in end-to-end abutting relation forming a continuous curved thermal channel for reception of said tube, said receptacle having at least one planar outside surface for heat transfer from said heating tube, at least one heat transfer plate adhesively attached to said at least one planar outside surface, and thermally conductive members contacting said receptacle and said heat transfer plate for conducting heat to surrounding structures.

13. The radiant heat distribution panel of claim 12 wherein;

said receptacle has a generally rectangular peripheral outline in cross section and is substantially symmetrical about a vertical centerline, said receptacle including a bottom outside planar surface opposite said open top side and an immediately adjacent planar outside surface.

14. The radiant heat distribution panel of claim 13 wherein said heat transfer plate comprises a flat sheet metal plate attached to said bottom surface.

15. The radiant heat distribution panel of claim 13 wherein said heat transfer plate comprises a sheet metal plate attached to each of said side surfaces, said sheet metal plates having outwardly extending fin portions and angularly bent portions attached to said side surfaces.

16. A method of constructing a radiant heat distribution panel for heat transfer from a flexible heating tube to thermally conductive surfaces comprising the steps of;

extruding an elongated thermally conductive heating tube receptacle having a thin walled body with an inside cylindrical surface and an open top side to form a thermal channel for receiving and retaining said heating tube therein, the outside surface of said thin walled body comprising a plurality of planar surface sections for heat transfer to thermally conductive planar surfaces, then maintaining said open top side of the thermal channel in a single plane, and simultaneously bending said elongated tube receptacle through an arc while maintaining the cross sectional area of said thermal channel substantially constant to form an arcuate tube receptacle section, whereby said heating tube may be inserted and retained in said thermal channel in an arcuate configuration, and then placing a planar surface of a thermally conductive heat transfer plate in heat transferring contact with at least one of the outside surface sections of said thin walled body, said heat transfer plate including a section extending outwardly from said thin walled body for heat distribution to surrounding thermally conductive surfaces.

17. The method of claim 16 including the further step of;

mating linear sections of said heating tube receptacle in an end-to-end abutting relation with arcuate tube receptacle sections to thereby retain a continuous heating tube in a serpentine pattern to form a radiant heat system for an extended area.

18. A receptacle for mounting a flexible heating tube comprising;

an elongated metal extrusion having thin receptacle walls with an inside surface and an open top side forming a thermal channel configured for snap-fit reception and retention of said heating tube, said receptacle including an outside surface comprising a plurality of planar surface sections for conducting heat from said heating tube to adjacent thermally conductive surfaces, said receptacle including at least one portion thereof extending in an arcuate configuration with said top side being located in a single plane, said metal extrusion being bendable for forming said arcuate portion, whereby said receptacle is formed into said arcuate portion subsequent to extrusion, mounting extruded linear sections of said tube receptacle in alternate end-to-end abutting relationship with a plurality of said arcuate tube receptacle portions, whereby a continuous heating tube may be continuously mounted in a serpentine pattern.

19. The receptacle of claim 18 wherein said receptacle cross section is generally rectangular in peripheral outline.

20. The receptacle of claim 18 wherein said inside surface includes a locus of points defining a semicircular pattern in cross section.

21. The receptacle of claim 20 wherein said receptacle cross section is generally rectangular in peripheral outline.

22. The receptacle of claim 20 wherein said inside surface comprises a continuous semicircular cylindrical surface, said heating tube being held in full surface-to-surface contact therewith for essentially conductive heat transfer.

23. The receptacle of claim 22 wherein said receptacle cross section is generally rectangular in peripheral outline.

24. A method of constructing a heating tube receptacle comprising the steps of;

extruding an elongated tube receptacle having a thin walled body with an inside surface and an open top side to form a thermal channel for receiving and retaining a heating tube therein, the outside surface of said thin walled body comprising a plurality of planar surface sections for heat transfer from said heating tube to thermally conductive planar surfaces, said thin walled body being uninterrupted by any substantial outwardly directed integral extensions beyond the surfaces of said planar surface sections, and forming said receptacle with a cross section substantially symmetrical about a vertical center line during extrusion.

25. The method of claim 24 including the step of;

forming said receptacle with a cross section which is generally rectangular in peripheral outline during extrusion.

26. The method of claim 24 including the step of;
  forming said thermal channel with a surface including a locus of points defining a substantially semicircular pattern in cross section configured to receive said heating tube.

27. The method of claim 26 including the step of;
  forming said receptacle with a cross section which is generally rectangular in peripheral outline during extrusion.

28. The method of claim 27 including the step of
  then placing a planar surface of a thermally conductive heat transfer plate in heat transferring contact with at least one of the outside surface sections.

29. The method of claim 28 wherein said heat transfer plate comprises a thin metal sheet and including the step of
  adhesively bonding said sheet metal plate to said at least one outside surface sections.

30. The method of claim 28 wherein said heat transfer plate comprises a thin metal sheet and including the step of;
  attaching said sheet metal plate to said at least one outside surface section with mechanical fastener means.

31. A method of constructing a heating tube receptacle comprising the steps of;
  extruding an elongated tube receptacle having a thin walled body with an inside semicircular surface and an open top side to form a thermal channel for receiving and retaining said heating tube therein, the outside surface of said thin walled body comprising a plurality of planar surface sections for heat transfer to thermally conductive planar surfaces,
  then maintaining said open top side of the thermal channel in a single plane and simultaneously bending said elongated tube receptacle through an arc while maintaining the cross sectional area of said thermal channel substantially constant to form an arcuate tube receptacle section.

32. The method of claim 31 wherein said arcuate tube receptacle section is bent to form a 180° arc, the method including the further step of:
  mounting extruded linear sections of said tube receptacle in alternate end-to-end abutting relationship with a plurality of said arcuate tube receptacle sections,
  whereby a continuous heating tube may be continuously mounted in a serpentine pattern.

33. The method of claim 31 wherein said heating tube is circular in cross section, said inside cylindrical surface including a locus of points defining a semicircular pattern in cross section.

34. The method of claim 33 wherein said tube receptacle is extruded with an inside surface having a continuous semicircular cylindrical surface, said heating tube being held in snap-fit engagement in full surface-to-surface contact therewith for essentially conductive heat transfer.

35. A receptacle for mounting a heating tube comprising;
  an elongated metal extrusion having thin receptacle walls with a cylindrical inside surface including a locus of points defining a semicircular pattern in cross section and configured to receive said heating tube, said walls forming a thermal channel for snap-fit retention of said heating tube and an outside surface comprising a plurality of planar outside surface sections,
  said receptacle walls being uninterrupted by any substantial outwardly directed extensions beyond the surfaces of said planar surface sections,
  said receptacle having a cross section substantially symmetrical about a vertical centerline, and
  said outside surface sections being adapted for conducting heat from said heating tube to adjacent thermally conductive surfaces.

36. A receptacle for mounting a flexible heating tube comprising;
  an elongated metal extrusion having thin receptacle walls with an inside surface and an open top side forming a thermal channel configured for snap-fit reception and retention of said heating tube,
  said receptacle including an outside surface comprising a plurality of planar surface sections adapted for conducting heat from said heating tube to adjacent thermally conductive surfaces,
  said receptacle including at least one portion thereof extending in an arcuate configuration with said top side being located in a single plane,
  said metal extrusion being bendable for forming said arcuate portion,
  whereby said receptacle is formed into said arcuate portion subsequent to extrusion,
  mounting extruded linear sections of said tube receptacle in alternate end-to-end abutting relationship with a plurality of said arcuate tube receptacle portions,
  whereby a continuous heating tube may be continuously mounted in a serpentine pattern.

* * * * *

UNITED STATES PATENT AND TRADEMARK OFFICE
CERTIFICATE OF CORRECTION

| | |
|---|---|
| PATENT NO. | : 7,021,372 B2 |
| APPLICATION NO. | : 10/911150 |
| DATED | : April 4, 2006 |
| INVENTOR(S) | : Dale H. Pickard |

It is certified that error appears in the above-identified patent and that said Letters Patent is hereby corrected as shown below:

Col. 5, lines 57-59 Delete "pointed out, other mechanical means for attaching the transfer plate 29 to the surface of the"

Signed and Sealed this

Twenty-second Day of August, 2006

JON W. DUDAS
*Director of the United States Patent and Trademark Office*